United States Patent [19]

Allen

[11] Patent Number: 4,646,237
[45] Date of Patent: Feb. 24, 1987

[54] DATA HANDLING SYSTEM FOR HANDLING DATA TRANSFERS BETWEEN A CACHE MEMORY AND A MAIN MEMORY

[75] Inventor: Jerrold L. Allen, San Diego, Calif.

[73] Assignee: NCR Corporation, Dayton, Ohio

[21] Appl. No.: 558,249

[22] Filed: Dec. 5, 1983

[51] Int. Cl.⁴ .................. G06F 13/00; G06F 12/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,593,299 | 7/1971 | Driscoll et al. | 364/200 |
| 3,723,976 | 3/1973 | Alvarez et al. | 364/200 |
| 4,384,327 | 5/1983 | Conway et al. | 364/200 |
| 4,387,441 | 6/1983 | Kocol et al. | 364/200 |
| 4,424,561 | 1/1984 | Stanley et al. | 364/200 |
| 4,445,172 | 4/1984 | Peters et al. | 364/200 |
| 4,464,717 | 9/1984 | Keeley et al. | 364/200 |
| 4,468,729 | 9/1984 | Schwartz | 364/200 |

Primary Examiner—James D. Thomas
Assistant Examiner—William G. Niessen
Attorney, Agent, or Firm—Wilbert Hawk, Jr; Edward Dugas; Floyd A. Gonzalez

[57] ABSTRACT

In a data handling system having one or more processors, a cache memory associated with each processor and a main memory unit, each cache memory is divided into an equal number of portions, and the main memory is divided into a corresponding number of portions. A data transfer bus is provided between each group of cache memory portions and the corresponding portion of main memory such that each group of cache memory portions corresponds to only a portion of main memory. Each data transfer bus in independently controlled such that the rate of data transfers for the system as a whole is increased.

5 Claims, 9 Drawing Figures

DATA HANDLING SYSTEM FOR HANDLING DATA TRANSFERS BETWEEN A CACHE MEMORY AND A MAIN MEMORY

BACKGROUND OF THE INVENTION

1. Field of the Invention

This invention relates to the field of multi-processor data handling systems, each processor having a cache memory. In particular, it relates to apparatus and method for increasing the data handling rate of such systems.

2. The Prior Art

As is known in the art, a large percentage of the commands issued by a processor involve memory commands which necessitate the transfer of data between the processor and a main storage unit. Cache memory units have been positioned between a processor and the main storage unit such that when a fetch command is issued by the processor, rather than fetching only the data at the address requested, a block of data is transferred from the memory storage unit to the cache memory in anticipation that further commands will involve data located at addresses located adjacent to the first requested address. Thus, rather than going to the main storage unit to fetch data with each command, it is only necessary to go to the cache memory unit until the bounds of the data in the cache memory is exceeded. This results in a great savings of time and is particularly valuable in a multiprocessor system.

To ensure that all processors in a multiprocessor system are operating on the same data, and that all data in the cache memory of the processors is identical to the data in the memory storage unit, each time a store command is issued by any processor, not only is the data at that address in the memory storage unit updated, but a check is made of each cache memory to see if the data present in the cache memory at that time needs to be updated. If data to be altered is present, each cache memory where it appears is additionally updated. It can thus be seen, that if each cache memory can correspond to any address in the main storage unit, that a few transactions between one processor and the memory storage unit could tie up the system by checking each cache memory and updating data therein.

U.S. Pat. No. 3,601,812 to Weisbecker discloses a memory system for buffering several computers to a central storage unit and includes an addressing scheme for identifying the memory location of data in the central storage unit such that each computer may retrieve from and restore data to the memory system.

U.S. Pat. No. 4,077,059 to Cordi et al. discloses a hierarchial memory system for a multiprocessing system having two types of memory units on each level. One memory unit is a data store unit and the other is a copyback data store unit which contains all of the changes that have been made either by addition or modification and that are to be copied back to the next lower level of the memory hierarchy. The Cordi et al. memory provides a hierarchial memory system which does not require straight duplication but rather employs copyback and journaling techniques.

U.S. Pat. No. 3,845,474 to Lange et al. discloses a multiprocessor system wherein each processor has a cache store, and the system has a single main memory shared by the processors.

SUMMARY OF THE INVENTION

In the present invention, each cache memory of each processor is divided into several portions, and the memory storage unit is divided into a corresponding number of portions such that each cache memory division is only responsible for a portion of the memory storage unit. Thus, each time a transaction between memory and a processor is executed, only those cache memory portions directly corresponding to the portion of the memory storage unit affected by the command needs to be updated. Also, the transactions between main memory and cache memory are distributed to more than one internal transfer bus such that the speed of the system is not limited to the ability of only one bus to handle data transfers, and is thus increased.

A preferred embodiment of the invention is a data handling system which includes a data processor, and a cache memory operatively connected to the data processor in which the cache memory is divided into at least two portions. The data handling system also includes a main memory divided into a number of portions equal in number to the number of portions into which the cache memory is divided. Data transfer buses are provided equal in number to the number of portions into which the cache memory and main memory are divided with each of the data transfer buses being connected to corresponding ones of the cache memory portions and the main memory portions. Also, a control circuit is associated with each data transfer bus for independently controlling the transmission of data between one of the cache memory portions and the corresponding portion of the main memory.

It is therefore an object of the present invention to provide an apparatus and method for increasing the rate of data transmission in a multiprocessor data handling system.

It is a further object to provide a divided cache in a data handling system, and a memory divided in a manner corresponding to the divided cache.

It is a further object of the invention to provide internal transfer buses individually serving the corresponding portions of the divided cache and memory.

It is a further object of the invention to provide means wherein peripheral devices may access data in any memory portion of a system in which the cache and memory are divided into corresponding portions.

DESCRIPTION OF THE PREFERRED EMBODIMENT

Figure 1A:
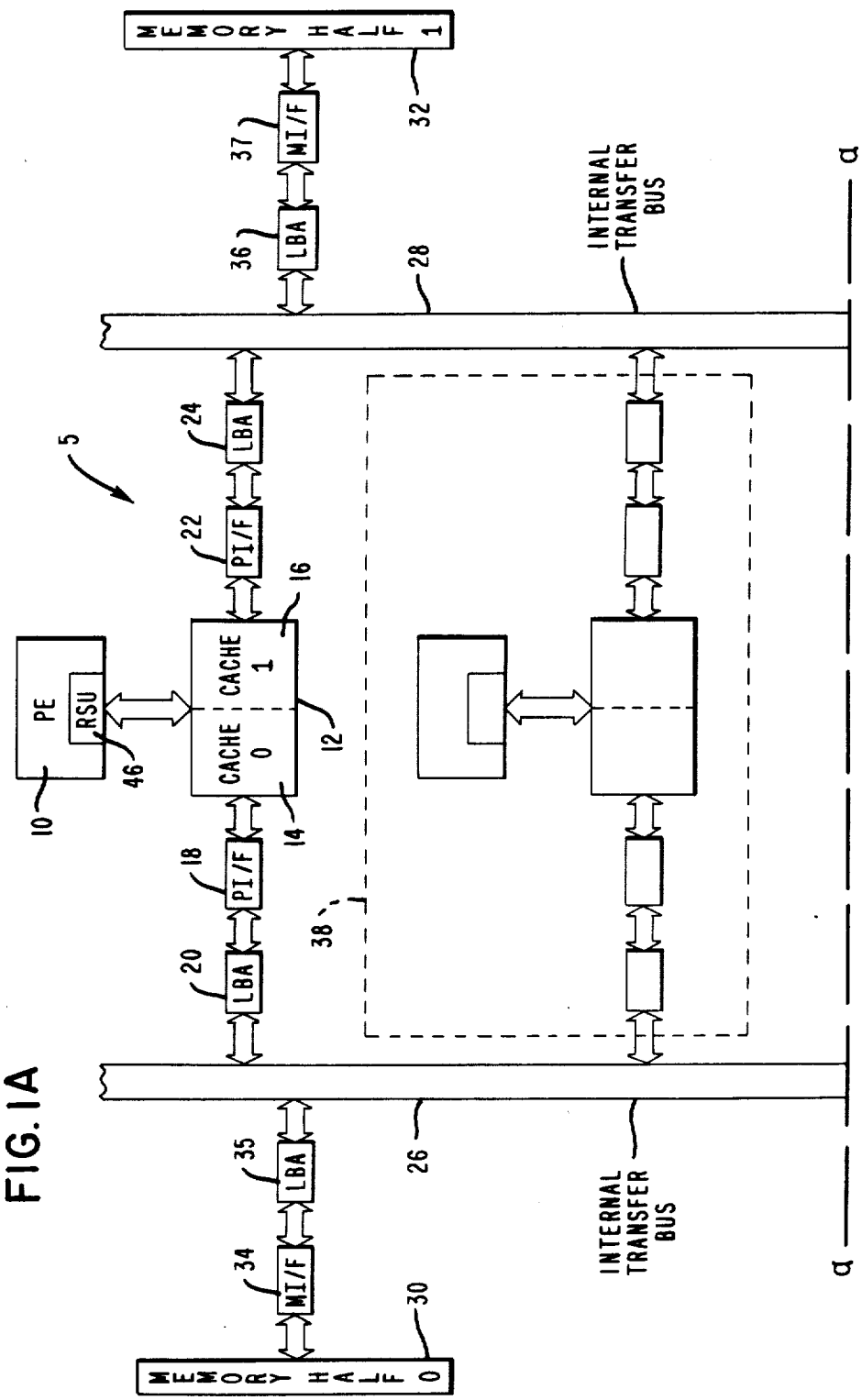
FIGS. 1A and 1B joined along line a—a is a block diagram of one embodiment of a system including the invention.
Figure 1B:
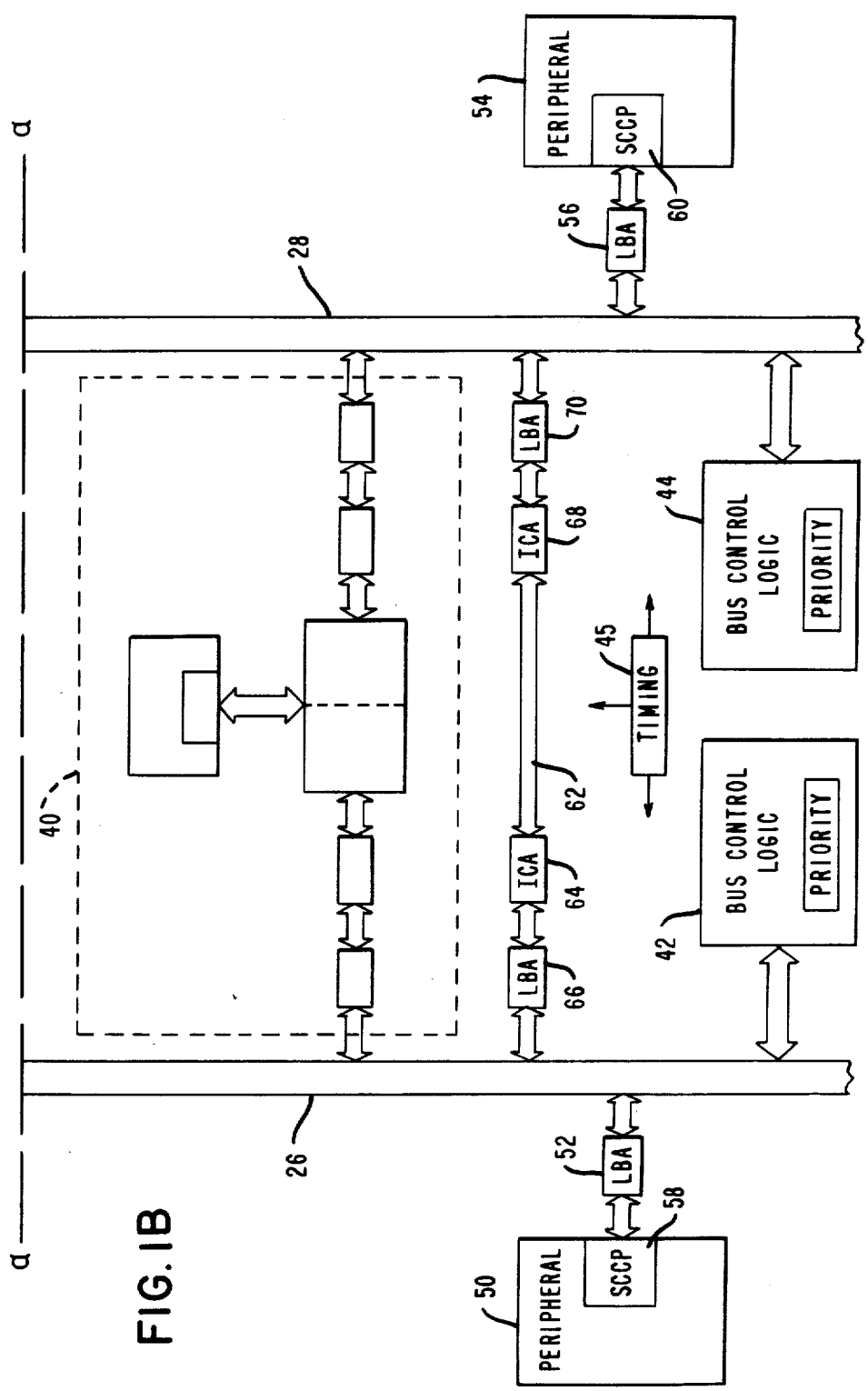

Attention is now directed to FIGS. 1A and 1B joined along line a—a which illustrates in a block diagram, a preferred embodiment of a data processing system including the present invention. The system includes a processor system 5 having a processor (PE) 10 which is connected to a cache memory 12. The cache memory 12 is divided into two sections 14 and 16 referred to herein as cache 0 and cache 1, respectively, which will be fully explained later.

Cache 0 at 14 is connected to a processor interface (PI/F) 18 which is in turn connected to a local bus adapter (LBA) 20, and cache 1 at 16 is connected to a processor interface 22, in turn connected to a local bus adapter 24. The local bus adapters 20 and 24 are similar to those disclosed in U.S. Pat. No. 4,038,644, issued July 26, 1977, to Duke et al. and assigned to the assignee of the present invention, hereby incorporated by reference.

Local bus adapter 20 is connected to internal transfer bus 26, and local bus adapter 24 is connected to internal transfer bus 28.

The data processing system features a divided memory storage, divided, for instance, into memory half 0 at 30 and memory half 1 at 32. Memory half 0 at 30 communicates with internal transfer bus 26 through memory interface (MI/F) 34 and local bus adapter 35, and memory half 1 at 32 communicates with internal transfer bus 28 through the memory interface 36 and local bus adapter 37. It can be seen that memory half 0 corresponds to cache 0 and memory half 1 corresponds to cache 1.

The data processing system may contain other processing systems 38 and 40 connected between internal transfer buses 26 and 28. These systems may have the same configuration as the previously-described processor system 5. The data processing system includes bus control logic circuits 42 and 44 and a timing system 45. The bus control logic circuits 42 and 44, among other functions, arbitrate all local bus adapter requests to use their respective internal transfer buses, each independent of the other, and correspond to the bus control logic circuit 6 of the mentioned Duke et al. patent. The timing circuit 45 corresponds to the timing circuit 7 of the Duke et al. patent, and may serve both of the bus control logic circuits 42 and 44. The present data processing system also includes a service subsystem and serial service bus as described in the mentioned Duke et al. patent, but which had been omitted from FIG. 1 for clarity.

The processor 10 may be any of a number of processors capable of controlling data flow from a main memory unit through a cache memory. The processor of the preferred embodiment is the NCR Model 8650, available from The NCR Corporation of Dayton, Ohio. The processor 10 includes a register storage unit or RSU 46 by which data is read into and out of the cache memory 12 as will be explained.

Figure 2:
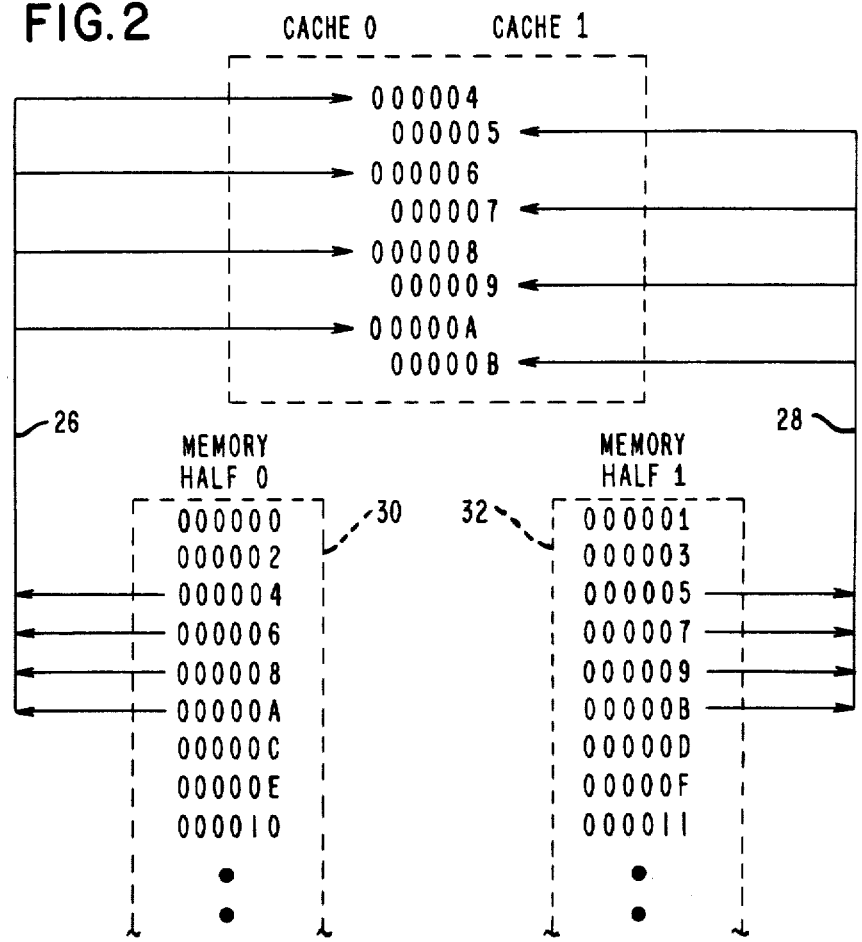
FIG. 2 is a diagrammatic representation of one embodiment of a cache and main memory usable with the system of FIG. 1.

FIG. 2 is a diagrammatic representation of the division of the main memory storage and the corresponding division of the cache memory. As shown, memory half 0 at 30 contains the even numbered addresses, and memory half 1 at 32 contains the odd-numbered addresses. It will thus be understood that data in even numbered addresses are transmitted between cache 0 and memory half 0 over the internal transfer bus 26. Likewise, data stored in the odd-numbered addresses of the main memory are transferred between cache 1 and memory half 1 over the internal transfer bus 28. Typically, the cache memory 12 holds data from eight four byte words, four in cache 0 and four in cache 1. It will be understood that the eight words shown in cache memory 12 are exemplary only. It will be further understood that data located in addresses anyplace in the main memory may be accessed by the processor 10 and loaded into the cache memory 12 in the divided arrangement shown. The arrangement shown is only one preferred embodiment wherein the even-numbered addresses are loaded in cache 0 and the odd-numbered addresses are loaded in cache 1. The cache memory 12 could, for example, be divided into three or more sections. In that case, the main memory would also be divided into three or more corresponding sections, with each portion of main memory and a corresponding portion of cache memory served by a separate internal transfer bus.

There is a further advantage in having the main memory distributed between cache 0 and cache 1 in an alternating fashion such as the odd-even arrangement as shown, in that access to any portion of the main memory will be distributed between the internal transfer buses, thereby evening out the data transfer load. In most cases, this will result in both buses being approximately equally busy with data transferring and updating duties so that the entire data processing system is not hampered by the overworking of one bus to the exclusion of the other or others.

In an illustrative example, if the processor 10 requires data, it looks into its RSU 46 to see if the data required is available there. If not, the processor sets a lock bit in the RSU to indicate that the processor must go beyond the RSU to find the data required. In the example here, the cache 12 determines if the address requested is even or odd and then goes to cache 0 if the address requested is even, or cache 1 if the requested address is odd. If the data is present in the cache memory 12, a condition known as a cache hit has occurred and the cache transfers the requested data to the RSU 46, removes the lock bit from the RSU, allowing the processor 10 to use the data. If, however, the requested address is not present in cache 12, a condition known as a cache miss has occurred and the data must be retrieved from the main memory.

Referring back to FIG. 1B, peripheral device 50 is connected to internal transfer bus 26 through a local bus adapter 52, and peripheral device 54 is connected to internal transfer bus 28 through local bus adapter 56. Peripheral devices 50 and 54 are controlled by serial channel control processors (SCCP) 58 and 60, respectively. It can be seen that in order for a peripheral device to have access to data in either memory half 0 or memory half 1, that provision must be made to transfer data between internal transfer bus 26 and internal transfer bus 28. For this reason, transfer bus 62 is provided, and is connected to internal transfer bus 26 through an interbus communication adapter 64 and a local bus adapter 66 at one end, and to internal transfer bus 28 through an interbus communication adapter 68 and a local bus adapter 70 at its other end.

It will be understood by those skilled in the art that several peripheral devices could be connected to either or both internal transfer buses. Only one peripheral device is shown connected to each internal transfer bus to simplify the drawing.

Commands requiring access to memory include memory addresses in the form of a signal of data bits, as is well-known in the art. It will be understood that any bit in the address can be used to divide the addresses into even and odd addresses. For instance, if the lowest bit of the address identifies a byte of data in memory, the lowest bit may be used to divide the data into even and odd bytes. However, if the data is normally handled in four byte words, and the lowest bit is used, each word that is accessed in memory will require access to both memory half 0 and memory half 1. In this case, it might be more desirable to use the third bit of the address, thus dividing the memory into even and odd words.

If transactions between the memory and each cache portion is in four word increments, it might be more desirable to divide the memory into increments of four words. In that case, only one cache to memory transaction is necessary to transfer the desired four-word block of data. To divide the memory in four-word blocks, the fifth bit would be used.

Many times, the memory is divided into blocks, referred to as pages, for various purposes. One use of such pages is to provide peripheral devices with buffer memories, such that a page of data may be read into the buffer memory to be processed by the peripheral device at its own speed. It can thus be seen that if the memory is divided into less than pages, and if a page of data is to be transferred between, for instance, peripheral device 50 and the memory, part of the data would have to be transferred over internal transfer bus 26, and part of the data would have to be transferred over internal transfer bus 28 and transfer bus 62. If, however, the memory is divided into even and odd pages, a single page of data may be transferred between a peripheral device and a single memory half in only one transaction. In the exemplary system, this is done by using the fourteenth bit to divide the data by 8,000 byte pages between cache 0 and cache 1, and memory half 0 and memory half 1, respectively.

Figure 3:
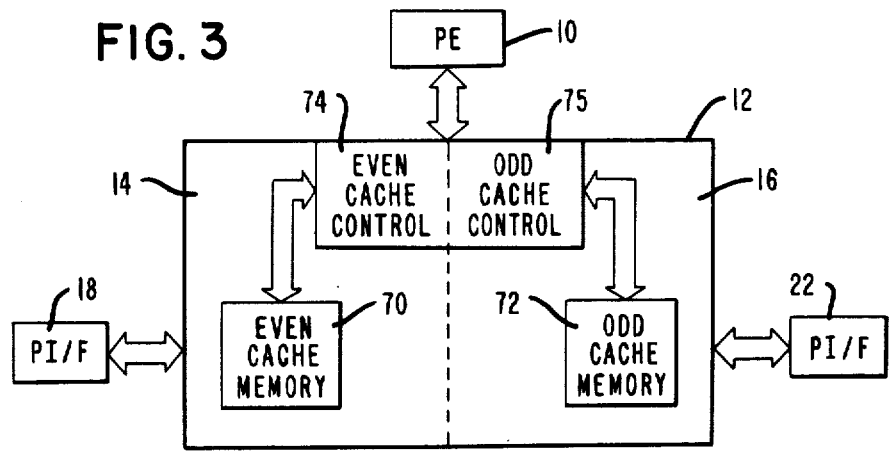
FIG. 3 is a block diagram of the cache of the system of FIG. 1.

Referring now to FIG. 3, cache 12 will be explained. As previously described, cache 12 is divided into cache 0 at 14 and cache 1 at 16. Each cache portion includes an identical cache memory. For instance, cache 0 at 14 includes a cache memory 70, identified as even cache memory, and cache 1 at 16 includes cache memory 72 identified as odd cache memory. Cache memories 70 and 72 may be a cache memory as disclosed in U.S. Pat. No. 4,315,312, issued Feb. 9, 1982, to Schmidt, assigned to the assignee of the present invention, hereby incorporated by reference. Cache memories 70 and 72 may either be a cache memory identified as prior art in the mentioned Schmidt patent, or may be a cache memory having a variable data block size as disclosed in the Schmidt patent. Cache 12 includes cache controls 74 and 75 which determine whether the processor 10 accesses the even cache memory 70 or the odd cache memory 72. As mentioned previously, this is done by determining if a selected bit in the memory address is a 1 or 0. If the selected bit is a 0, the even cache control 74 directs the memory command to the even cache memory 70. If, however, the selected bit is a 1, the odd cache memory control 75 directs the memory command to odd cache memory 72. If the selected bit is a 0, odd cache control 75 issues a no-operation command to odd cache memory 72 in order that when the even cache memory 70 executes the memory command, the odd cache memory 72 will remain idle. The opposite occurs if the selected bit is 1. The cache controls 74 and 75 further arbitrate responses from cache memories 70 and 72 such that the cache memories 70 and 72 do not attempt to access the same RSU in the processor 10 at the same time.

It will be understood, that after memory commands are directed to the appropriate cache memory, the data processing system will operate in the normal manner transmitting data between the respective cache memory and its memory half as is well understood in the art. It can also be seen that memory commands coming from cache 0 will include only even numbered addresses, either byte, word, page or other convenient size block as previously described. Memory half 0 may contain a full main memory, and the system would operate as normal with no changes. However, since only memory commands for even addresses are directed to it, only the even memory addresses in memory half 0 would be used and the odd addresses would never be accessed. Likewise, only the odd addresses in memory half 1 would be accessed. For this reason, the memory interface circuits 34 and 37 can be modified to allow access to the entire memory of the memory halves 30 and 32.

Figure 4:
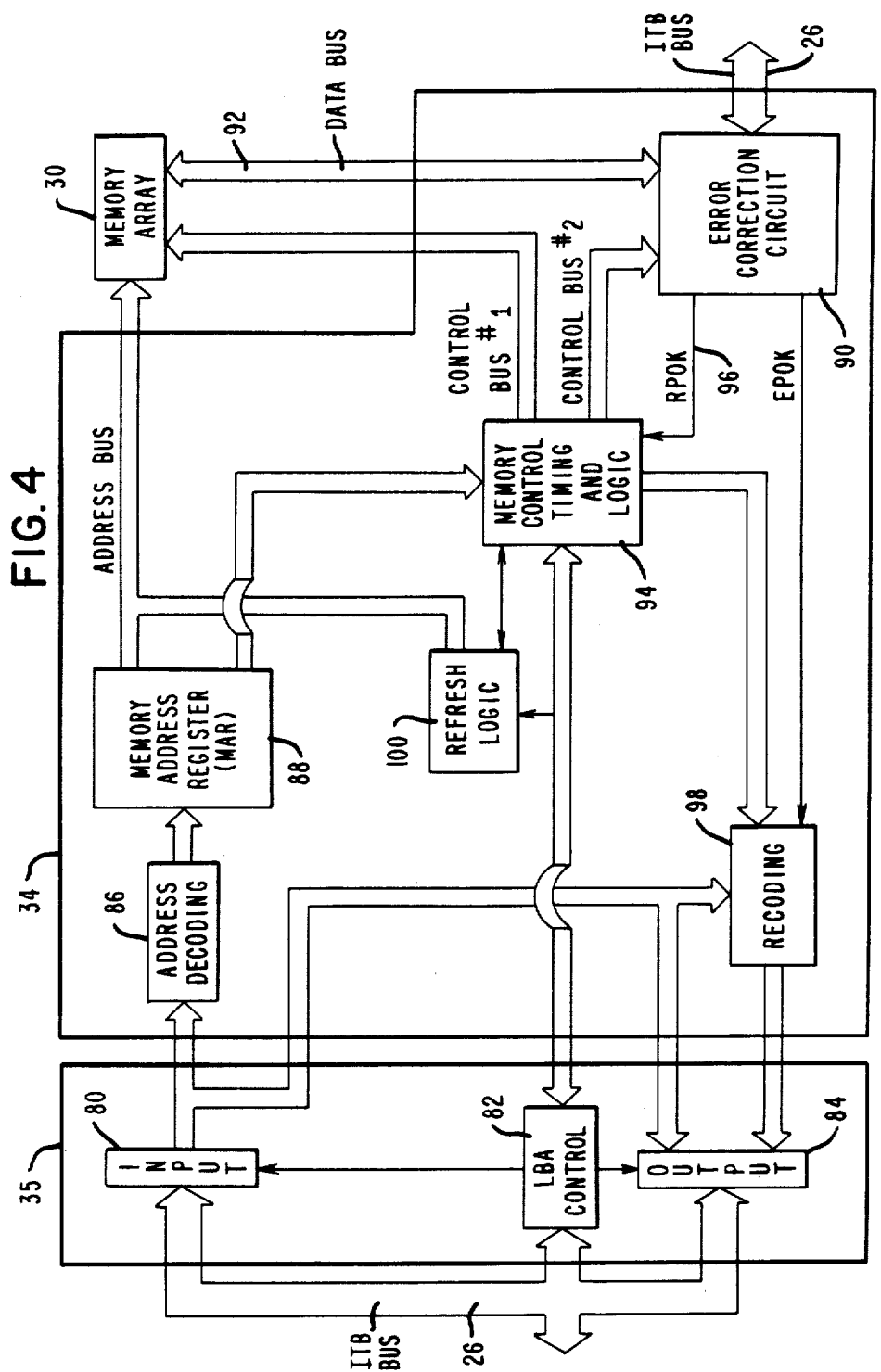
FIG. 4 is a block diagram of a local bus adapter, memory interface and memory half usable with the system of FIG. 1.

FIG. 4 is a block diagram showing the relationship between a local bus adapter, a memory interface and an associated memory half which is usable in the invention. The local bus adapter, which for example, may be local bus adapter 35, has an input buffer 80, a control circuit 82, and an output buffer 84, all of which are explained in the aforementioned Duke et al. patent. The control circuit 82 is generally described in connection with FIGS. 2A and 2B of the Duke patent, and input buffer 80 and output buffer 84 correspond to input buffer 22 and output buffer 13, respectively of that patent.

The memory address associated with the memory command is received from the internal transfer bus 26 into the input buffer 80 of the local bus adapter 35. This address is passed to the memory interface 34 into an address decoding circuit 86 where the address is decoded and placed in the memory address register 88. The data to be transferred between the memory half and its corresponding cache is received into an error correction circuit 90 from the internal transfer bus 26. If the memory command is a fetch, the data in the memory array of memory half 30 at the address represented in the memory address register 88 is transferred from the memory array 30 into the error correction circuit 90 over the data bus 92. If the memory command includes a store operation, the data received from the internal transfer bus 26 into the error correction circuit 90 is transferred into the memory array 30 to the address represented in memory address register 88 from the error correction circuit 90 over data bus 92. The transfers are controlled by the memory control timing and logic circuit 94 in response to various signals from other circuits in the memory interface 34. For instance, if the error correction circuit 90 determines that there are no errors in the data received from the internal transfer bus 26, a signal is sent from the error correction circuit 90 over line 96 to the memory control circuit 94 to indicate that the command is to be completed, and an appropriate code is placed on the internal transfer bus 26 to indicate that the transaction is complete. A recoding circuit 98 is provided to place into the output buffer 84 of the local bus adapter 35 appropriate codes to indicate if a memory command was executed, and if any errors occurred during execution. In certain commands, such as a fetch command, the source code of the local bus adapter transmitting the command is recoded as the destination such that the requested data will be returned from the memory array to the proper local bus adapter and its connected cache and processor. A refresh logic circuit 100 is provided in those cases where the memory array includes volatile memory devices to periodically refresh the data stored in the memory arrays such as is known in the art.

Figure 5:
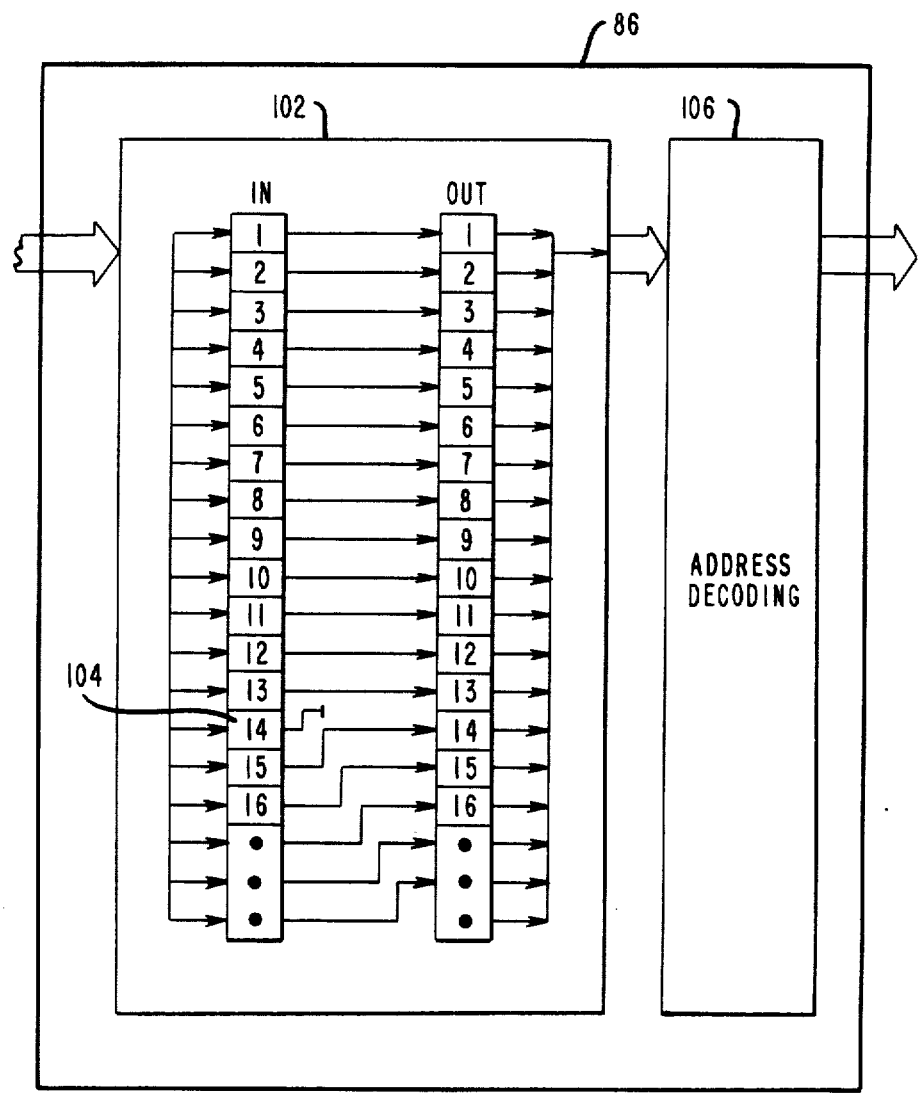
FIG. 5 is a block diagram of an address decoding circuit of the memory interface of FIG. 4.

All of the elements and operation of the circuits shown in FIG. 4 are well-known in the art and further explanation to understand the invention is not necessary. However, certain changes in the address decoding circuit 86 have been made, which will now be explained. FIG. 5 is a block diagram of the address decoding circuit 86 which includes a bit selection circuit 102 and the normal address decoding circuit 106. The circuit 102 receives the address from the local bus adapter 35 as previously explained and recodes the address with the selected bit missing. For instance, in the even-odd paging example explained, the fourteenth bit as shown at 104 is dropped and the higher order bits are shifted such that the address decoding circuit 106 will now treat the recoded address as if no change occurred. The result is that the memory circuit will not see any difference in the recoded memory addresses. However, only half the memory size is necessary for each memory half because all memory address locations can now be addressed. Looking back at FIG. 4, it can be seen that the memory address in its unaltered state is directed to the output buffer 84 and the recoding circuit 98 for forming messages back to the cache and processor. Thus, all memory addresses which form part of the data going back to the cache are in their unaltered state and can be handled by the system as if no changes to the memory and its interface have occurred.

This arrangement thus allows all of the even numbered memory blocks to be handled by the cache 0 and memory half 0 circuits, and all odd numbered memory blocks to be independently handled by the cache 1 and memory half 1 circuits with no other changes being necessary.

Figure 6:
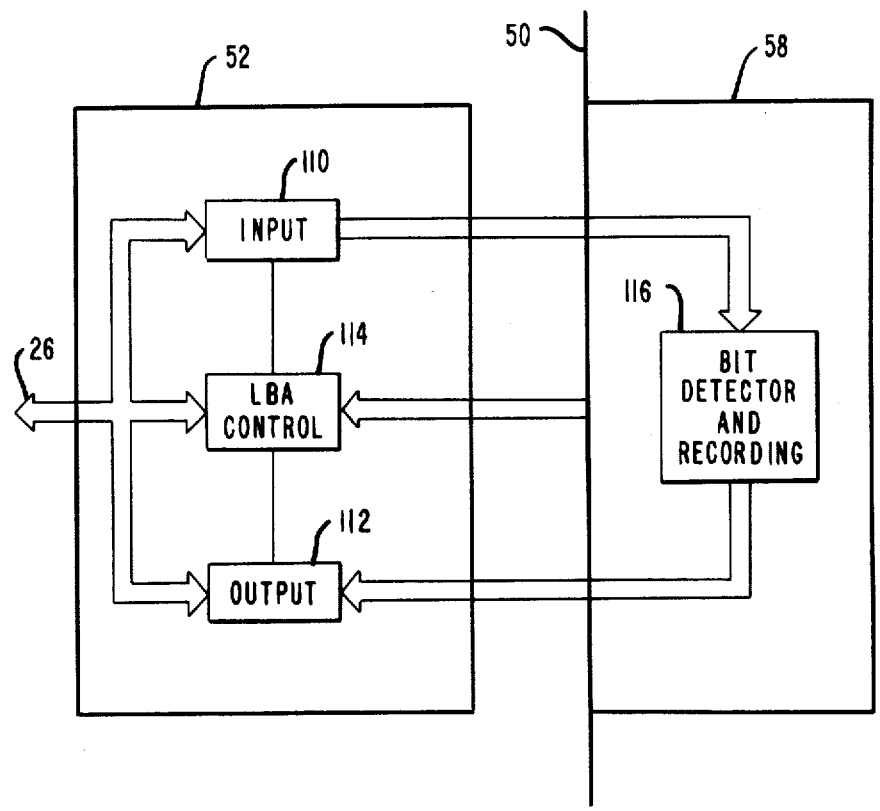
FIG. 6 is a block diagram of a local bus adapter and a portion of the control circuit of a peripheral device of the system of FIG. 1.

FIG. 6 is a block diagram for a serial channel control processor of a peripheral device and its local bus adapter. The peripheral device shown can be for any peripheral device on the system such as peripheral device 50 having serial channel control processor 58. The local bus adapter is connected to the internal transfer bus 26 and has an input buffer 110 and an output buffer 112 and a local bus adapter control 114 as previously explained in connection with local bus adapter 35. The serial channel control processor 58 controls one or more peripheral devices connected to it as will be understood by those skilled in the art. The serial channel control processor 58 includes a bit detector 116 whose function will now be discussed.

As is known in the art, when a processor wishes to use a peripheral device, an input/output field known as an IOF is set up in memory. The IOF contains commands for the peripheral device, an identification of the peripheral device to be used, and a location in memory where the data used by the peripheral device is to be fetched or stored, dependent upon the processor command issued. The peripheral device is then instructed to read the IOF from the memory assigned by the processor. The peripheral device then retrieves the content of the IOF and executes the command as instructed therein.

It will be remembered that the memory addresses placed on the internal transfer buses 26 or 28 have not been altered, and that a selected bit, such as the fourteenth bit used herein, indicates whether the address is located in memory half 0 or memory half 1. Thus, when the peripheral device 50 is instructed to read an IOF in a particular memory half, or to place data into or receive data out of a particular memory location, the fourteenth bit will identify which memory half is to be used. The bit detector 116 in the serial channel control processor 58 checks the fourteenth bit of the memory address and makes corresponding changes in the address of the destination local bus adapter in the output buffer 112 such that the correct memory half is accessed to complete the desired peripheral operation. For instance, if an IOF is defined by a processor in memory half 0 which instructs a peripheral device to retrieve data from a page of memory located in memory half 1, the bit detector 116 will monitor the address of the memory location where the data to be retrieved by the peripheral resides. In this case the bit detector 116 will determine that the fourteenth bit is a 1 and as a result, recode the destination as memory half 1. In this case, the local bus adapter 66 will be addressed.

When the output buffer 112 of the local bus adapter 52 is in condition to transmit its data on the internal transfer bus 26, the local bus adapter control 114 will be instructed by bus control circuit 42 to transmit the data from local bus adapter 52 to the destination local bus adapter 66. When the local bus adapter 66 receives the data from local bus adapter 52, the data, including the ultimate destination code for the local bus adapter 36, will be placed in buffers in the interbus communication adapter 64 and transmitted over bus 62 to buffers in the interbus communications adapter 68. When the data has been transferred from interbus communications adapter 64 to interbus communications adapter 68, the local bus adapter 70 will be instructed to place the data on internal transfer bus 28. Local bus adapter 70 is operable independent from the transfers taking place on the internal transfer bus 26 under the control of bus control logic circuit 44. The bus control logic circuit 44 receives from the local bus adapter 70, the destination code for the local bus adapter 36. When local bus adapter 70 has priority and local bus adapter 36 is not busy, the data which originated from peripheral 50 will be transmitted over internal transfer bus 28 from local bus adapter 70 to local bus adapter 36, and the peripheral command will be performed in memory half 1.

If the peripheral command was to retrieve data from memory half 1, the source address carried with the data indicates that the data is to be returned to internal transfer bus 26. When the local bus adapter 36 is ready to return the requested data, the requested data will be transmitted from local bus adapter 36 to local bus adapter 70 under the control of the bus control logic circuit 44. Upon receipt of the data by local bus adapter 70, the data will be placed in registers in interbus communications adapter 68 for transmission over bus 62 to the interbus communications adapter 64. Upon arrival at interbus communications adapter 64, the transfer of the data will be under control of the bus control logic circuit 42. Now the destination address will be decoded by the bus control logic circuit 42, and the data will be transmitted from local bus adapter 66 over internal transfer bus 26 to local bus adapter 52 as described in the Duke et al. patent. The construction of interbus communication adapters 64 and 68 and methods for effecting interbus communications is well-known in the art and further discussion is not needed.

Figure 7A:
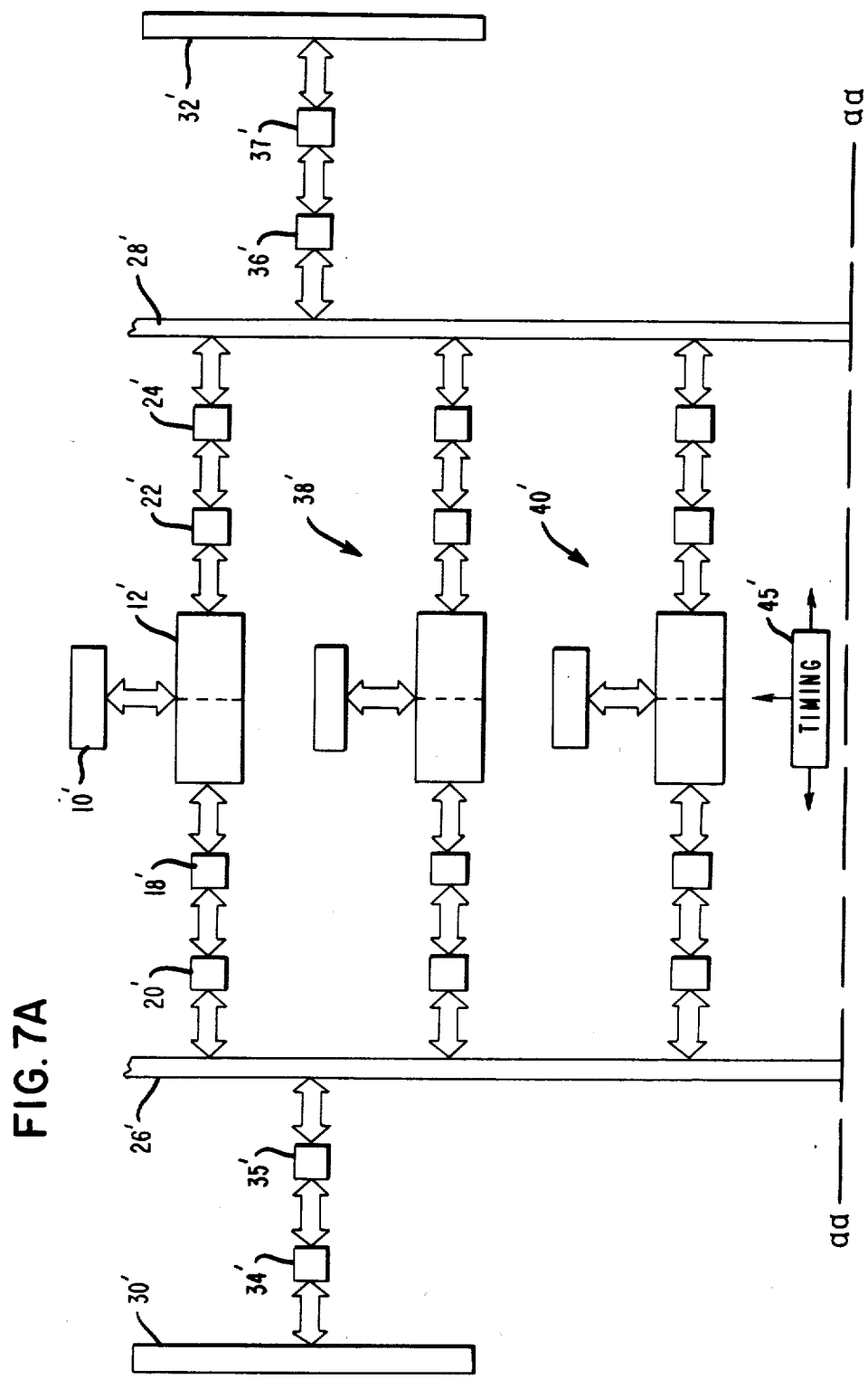
FIGS. 7A and 7B joined along line aa—aa is a block diagram of another embodiment of a system including the invention.
Figure 7B:
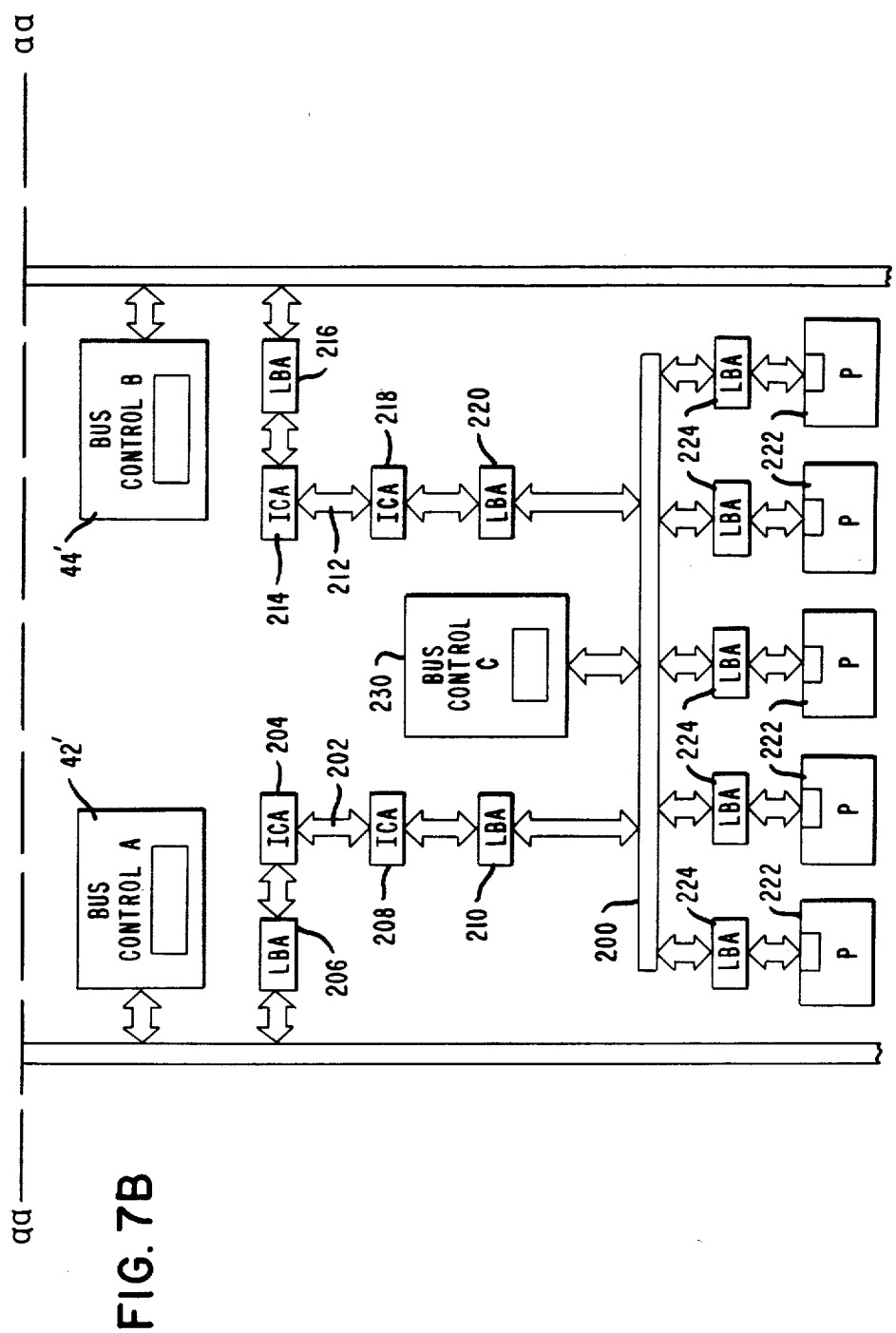

FIGS. 7A and 7B joined along line aa—aa is a block diagram showing a configuration of a system of the invention wherein a separate bus 200 is provided for all peripheral devices. The system of FIGS. 7A and 7B includes a processor 10' and its associated cache 12' connected to an internal transfer bus 26' by an interface 18' and local bus adapter 20'. The cache 12' is further connected to an internal transfer bus 28' by interface 22' and local bus adapter 24' as previously described in connection with FIGS. 1A and 1B. Internal transfer bus 26' serves memory half 30' through local bus adapter 35' and memory interface 34' as previously described. Also, memory half 1 at 32' is served by internal transfer bus 28' by local bus adapter 36' and interface 37' as described. The system of FIGS. 7A and 7B has similar processor sub-systems 38' and 40', and a timing circuit 45' and a bus control circuit at 42' controlling internal transfer bus 26', and a bus control circuit at 44' controlling internal transfer bus 28'. Communications between internal transfer bus 26' and peripheral bus 200 is controlled by a transfer bus 202 connected at one end to interbus communications adapter 204 and local bus adapter 206, and at the other end to interbus communications adapter 208 and local bus adapter 210 as shown. Communications between internal transfer bus 28' and the peripheral bus 200 is controlled by transfer bus 212 which is connected at one end to internal transfer bus 28' through interbus communications adapter 214 and local bus adapter 216, and is connected at its other end to peripheral bus 200 through interbus communications adapter 218 and local bus adapter 220.

A plurality of peripheral devices 222 is connected to the peripheral bus 200 by local bus adapters 224, with a single local bus adapter being connected to each peripheral device as shown. A bus control and logic circuit 230 controls the transfer of data over peripheral bus 200 as previously discussed and as disclosed in the aforementioned Duke et al. patent. In the configuration of FIGS. 7A and 7B, all commands directed to peripheral devices 222 are directed to the peripheral bus 200. Commands from internal transfer bus 26' are directed to the local bus adapter 206 which serves the transfer bus 202. Peripheral commands on internal transfer bus 28' are directed to local bus adapter 216 which serves transfer bus 212.

Data transfers from a peripheral device 222 to either of the internal transfer buses 26' or 28' may be determined with the previously discussed bit detection circuit in the serial channel control processor of the peripheral by checking the fourteenth bit of the memory address and sending data to the internal transfer bus 26' if the bit is 0 and to the internal transfer bus 28' if the bit is 1.

It will be understood that as many peripheral buses as desired may be added to handle a greater number of peripheral devices as long as the maximum number of local bus adapters which can be controlled by a bus control circuit is not exceeded.

While the invention has been described with reference to specific embodiments thereof, it will be understood by those skilled in the art that various changes and modifications can be made therein without departing from the spirit and scope of the invention as hereinafter claimed.

What is claimed is:

1. A data handling system comprising:
    a data processing means;
    a first cache memory means for storing data having even numbered addresses;
    a second cache memory means for storing data having odd numbered addresses;
    a data transmitting means connected between said data processing means and said first and second cache memory means, said data transmitting means for transmitting data having even numbered addresses between said data processing means and said first cache memory means and for transmitting data having odd numbered addresses between said data processing means and said second cache memory means;
    a first main memory means for storing data having even numbered addresses;
    a first data transfer bus means connected between said first cache memory means and said first main memory means for transferring data with even numbered addresses between said first cache memory means and said first main memory means;
    a first control means for controlling said second data transfer bus means;
    a second main memory means for storing data having odd numbered addresses;
    a second data transfer bus means connected between said second cache memory means and said second main memory means for transferring data with odd numbered addresses between said second cache memory means and said second main memory means; and
    a second control means for controlling said second data transfer bus means such that the data transfers between said second cache memory means and said second main memory means are independent from the data transfers between said first memory means and said first main memory means.

2. The data handling system of claim 1 further comprising:
    a peripheral device connected to one of said first or second data transfer bus means for receiving data therefrom; and
    a third data transfer bus means connected between said first and second data transfer bus means for transferring data between said first and second data transfer bus means for receipt by said peripheral device.

3. The data handling system of claim 2 wherein the third data transfer bus means comprises:
    a first interbus communications adapter connected to said second data transfer bus means and controlled by said second control means, said first interbus communication adapter for transferring data to and from said second data transfer means;
    an internal transfer bus for transferring data to and from said first interbus communications adapter; and
    a second interbus communications adapter connected between said internal transfer bus and said first data transfer bus means and controlled by said first control means, said second interbus communications adapter for transferring data between said first data transfer means and said internal transfer bus such that said peripheral device receives data from both of said first and second data bus transfer means.

4. The data handling system of claim 1 further comprising:
    a second data processing means;

a third cache memory means for storing data from said data processing means having even numbered addresses, and further being connected to said first data transfer bus means;

a fourth cache memory means for storing data from said second data processing means having odd numbered addresses, and further being connected to said second data transfer bus means;

a second data transmitting means connected between said second data processing means and said third and fourth cache memory means, said data transmitting means for transmitting data having even numbered addresses between said second data processing means and said third cache memory means, and for transmitting data having odd numbered addresses between said data processing means and said fourth cache memory means;

said first control means includes a first priority means for arbitrating data transfers between said first main memory means and said first and third cache memory means; and said second control means includes a second priortiy means for arbitrating data transfers between said second main memory means and said second and fourth cache memory means.

5. The data handling system of claim 1 further comprising:

a third data transfer bus means connected between said first and second data transfer bus means;

a first interbus communication adapter between said first data transfer bus means and said third data transfer bus means for transferring data having even number addresses from said first data transfer bus means to said third data transfer bus means;

a second interbus communications adapter between said second data transfer bus means and said third data transfer bus means for transferring data havng odd numbered addresses from said second data transfer bus means to said third data transfer bus means;

a third control means for controlling said first and second interbus communications adapters and the transfer therethrough of data onto said third data transfer bus; and a peripheral device connected to said third data transfer bus means for the receipt of data having both odd and even addresses from said third data transfer bus means.

* * * * *